(12) United States Patent  (10) Patent No.: US 7,457,789 B2
Axling  (45) Date of Patent: Nov. 25, 2008

(54) CONFIGURATION ASSISTANCE FOR COMPLEX PRODUCTS

(75) Inventor: Tomas Axling, Stockholm (SE)

(73) Assignee: Tacton Systems AB, Stockholm (SE)

( * ) Notice: Subject to any disclaimer, the term of this patent is extended or adjusted under 35 U.S.C. 154(b) by 0 days.

(21) Appl. No.: 11/205,941

(22) Filed: Aug. 17, 2005

(65) Prior Publication Data

US 2007/0094175 A1     Apr. 26, 2007

(51) Int. Cl.
  *G06N 5/00*     (2006.01)
(52) U.S. Cl. .......................................... 706/19; 706/45
(58) Field of Classification Search ................. 382/240, 382/302; 703/2, 13; 706/19, 13; 709/202
  See application file for complete search history.

(56) References Cited

U.S. PATENT DOCUMENTS

| | | | |
|---|---|---|---|
| 4,809,346 A * | 2/1989 | Shu ............................. | 382/302 |
| 4,809,347 A * | 2/1989 | Nash et al. ................... | 382/240 |
| 4,821,220 A * | 4/1989 | Duisberg ....................... | 703/2 |
| 5,515,524 A | 5/1996 | Lynch et al. | |
| 5,874,955 A | 2/1999 | Rogowitz et al. | |
| 6,049,819 A * | 4/2000 | Buckle et al. ............... | 709/202 |
| 6,223,170 B1 | 4/2001 | Skovgaard | |
| 6,272,479 B1 * | 8/2001 | Farry et al. ................... | 706/13 |
| 6,336,110 B1 | 1/2002 | Tamura et al. | |
| 6,374,202 B1 * | 4/2002 | Robinson ..................... | 703/13 |
| 7,016,882 B2 * | 3/2006 | Afeyan et al. ................. | 706/13 |
| 2002/0156698 A1 | 10/2002 | Machau et al. | |
| 2005/0071135 A1 | 3/2005 | Vredenburgh et al. | |
| 2005/0209829 A1 | 9/2005 | Binzer et al. | |

FOREIGN PATENT DOCUMENTS

WO    WO 98/43160    10/1998

* cited by examiner

*Primary Examiner*—Wilbert L Starks, Jr.
(74) *Attorney, Agent, or Firm*—Alston & Bird LLP

(57) ABSTRACT

Disclosed are interactive computer-implemented support solutions for facilitating the configuration of complex artifacts having characteristics that vary over a relatively wide range of possibilities. The artifact is defined by a configuration model and its features are described by a set of interrelated parameters. A model translation module converts the configuration model into a constraint satisfaction problem. The constraint satisfaction problem, in turn, is defined by a set of variables, wherein each variable may attain a finite number of different values, and a set of constraints restricting which variable values that are simultaneously possible for the variables in the set of variables. A configuration engine calculates a solution to the constraint satisfaction problem, which is optimal with respect to a value assigned to each variable in the constraint satisfaction problem relative to a predefined optimizing criterion. The configuration engine also derives a set of optimal parameter values associated with the calculated solution.

36 Claims, 2 Drawing Sheets

CONFIGURATION ASSISTANCE FOR COMPLEX PRODUCTS

BACKGROUND OF THE INVENTION

1. Field of the Invention

Figure 1:
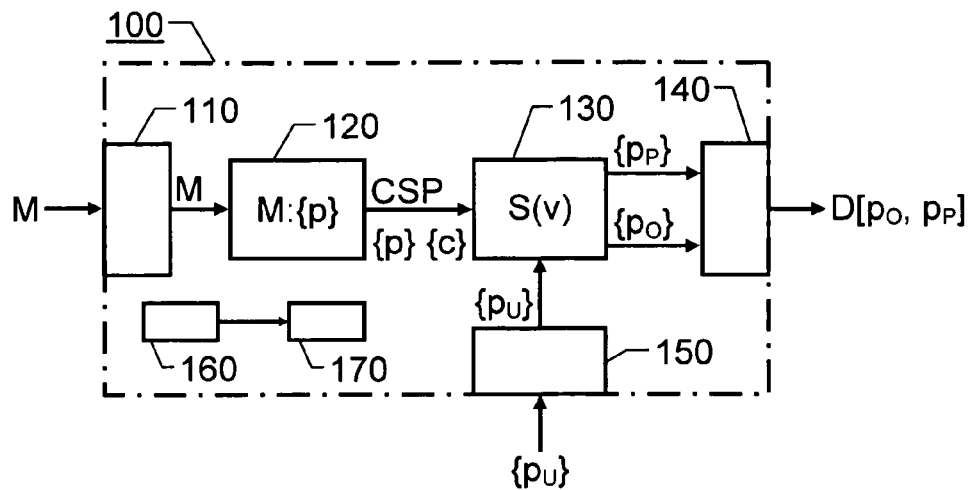

The present invention relates generally to interactive computer-implemented support solutions intended to facilitate the configuration of complex products having characteristics that are variable over a relatively wide range of possibilities.

2. Description of Related Art

When a customer orders or purchases a product, or a system of products, hereinafter collectively referred to as an artifact (e.g. a car, a truck or a computer), which has a plurality of selectable features, sub-components etc., it may be a very intricate and tedious task to find a combination of features that is both technically permissible and satisfies the customer's requirements (as well as applicable regulatory restrictions, such as maximum vehicle dimensions and axle weights). Moreover, the combinations of possible choices are often interrelated, such that for instance a particular gearbox can only be used together with certain engine types. Of course, depending on choices made at one stage, other choices to be made at a later stage may become irrelevant. For example, in the computer case, if a user chooses not to include a CD-ROM station in his/her PC, but instead opts for a DVD read/write station, he/she is not interested in having to specify a particular CD-ROM model in a later step in the configuration procedure.

U.S. Pat. No. 5,515,524 describes a method and an apparatus for configuring systems, which employs a generative approach. Here, configuration system with a model hierarchy is used, which is referred to as being a constraint-based. This approach renders it possible to define a model element as being contained in, or by, another model element. Consequently, logical and physical interconnections between various elements can be identified. However, the configuration engine operates in batch mode, i.e. it can only be applied to a complete set of parameters. This means that the mechanisms for selecting the parameters and the logic associated therewith are separated from the configuration model. As a result, only relatively low degrees of efficiency and user-friendliness are attainable.

U.S. Pat. No. 5,874,955 discloses an interactive rule-based system with selection feedback that parameterizes rules to constrain choices for multiple operations. This system may reduce the number of necessary choices. However, since at each stage, also options potentially incompatible with the configuration according to the prior choices are presented to the user, a latest made parameter selection can result in a rejection. Typically, this will irritate the user who then must step back a number of steps, and choose differently.

U.S. Pat. No. 6,336,110 describes a system for solving a constraint satisfaction problem (CSP) and constructing of a system, wherein a large CSP is divided into a plurality of subsets, which each only has two alternatives for each part. Allegedly, this division renders it possible to solve the large CSP relatively quickly. However, in practice, configuration problems often contain variables with very large domains, e.g. length. Therefore, this division-approach is not efficient. Namely, the number of subsets here becomes unrealistically large.

U.S. Pat. No. 6,223,170 reveals a solution for inference of partial knowledge in interactive configuration which enables configuration of a set of object values in a computer, e.g. in order to configure a car by choosing a specific combination of engine, paint, accessories, etc. The object values are here constrained by a rule base defining a number of relationships between the objects or the object values. Knowledge about undetermined object values is deduced by means of at least one interruptable algorithm. Thus, it can be determined whether a user selection of a part, or all of, the individual undetermined object values are possible or not. Nevertheless, the strategy proposed in this document is tightly linked to the configuration of a particular product having predetermined object values and constraints. In order to be applicable to the configuration of a different product the apparatus and the method performed thereby must be redesigned. Naturally, this is highly inflexible.

The published International Patent Application WO98/43160 describes another solution for configuring a number of parameters of a particular device, which is associated with the same type of inflexibility.

Hence, there exist numerous prior-art solutions that are capable of presenting a complex artifact configuration problem to a user in such a manner that the user is aided to configure the artifact in agreement with his/her requirements. However, there is yet no example of a solution, which on one hand, is capable of avoiding unnecessary queries and the risk of selecting incompatible combinations of parameters, and on the other hand, allows a high degree of flexibility with respect to the configuration problem to be solved.

BRIEF SUMMARY OF THE INVENTION

The object of the present invention is therefore to provide a flexible artifact configuration solution, which alleviates the above problems and thus offers an efficient and highly user-friendly aiding tool.

According to one aspect of the invention, the object is achieved by a system for configuring an artifact having variable features defined by a set of interrelated parameters. It is presumed that a range of consistent configurations for the artifact and the interrelationships between the parameters are described by configuration model. The proposed system includes a model translation module and a configuration engine. The model translation module is adapted to convert the configuration model into a constraint satisfaction problem (CSP). The CSP, in turn, is defined by a set of variables and a set of constraints. Each variable in the set of variables may attain a finite number of different values. The set of constraints restricts which variable values that are simultaneously possible for the variables in the set of variables. The configuration engine is adapted to calculate an optimal solution to the constraint satisfaction problem, where the calculated solution is optimal with respect to a value assigned to each variable in the CSP relative to a predefined optimizing criterion, e.g. cost or weight. The configuration engine is also adapted to derive a set of optimal parameter values that are associated with the optimal solution.

Important advantages of this system are that a broad range of configuration problems can be processed, which each is defined by a particular configuration model, and that for each problem a primarily optimal configuration of an artifact can be found very efficiently.

According to one preferred embodiment of this aspect of the invention, the configuration engine is further adapted to derive a set of possible parameter values, which are compatible with the set of constraints. Naturally, the set of possible parameter values include the set of optimal parameter values. Preferably, the system also includes a presentation interface module, which is adapted to receive at least one set of parameter values from the configuration engine, and in response thereto generate at least one display set of parameter values adapted to be presented on a graphical display. Hence, the user can be provided with straightforward and intuitive means of modifying the parameter values within the relevant constraints.

According to another preferred embodiment of this aspect of the invention, the system includes an input interface module, which is adapted to receive at least one user-generated input defining a set of updated parameter values. The set of updated parameter values is included in the set of possible parameter values (i.e. is compatible with the set of constraints). Additionally, the input interface module is adapted to forward the set of updated parameter values to the configuration engine, so that an updated optimal solution to the CSP may be calculated. Preferably, the configuration engine is also adapted to derive a set of optimal parameter values associated with the updated solution. Thus, a user-friendly flexibility in respect of the parameter setting is attained.

According to yet another preferred embodiment of this aspect of the invention, the configuration model is structured as a part-of hierarchy that includes a number of nodes. A respective variable in the set of variables is associated with each of these nodes, and each node that is associated with a variable included in the calculated solution is defined as an active node. It is further preferable if the system comprises a presentation interface module, which is adapted to generate at least one display set of parameter values for presentation on a graphical display. The at least one display set of parameter values may exclusively include parameter values derivable from variables in the set of variables that are associated with the active nodes. Thereby, the graphics presented to the user can be restricted to show only those parameters and ranges that are consistent with the applicable constraints.

According to another aspect of the invention the object is achieved by a method of configuring an artifact having variable features defined by a set of interrelated parameters. It is presumed that a configuration model defines a range of consistent configurations for the artifact and the interrelationships between the parameters. The proposed method includes the step of converting the configuration model into a CSP. The CSP, in turn, is defined by a set of variables, wherein each variable may attain a finite number of different values, and a set of constraints restricting which variable values that are simultaneously possible for the variables in the set of variables. The method also includes the step of calculating a solution to the CSP. The calculated solution is here optimal with respect to a value assigned to each variable in the CSP relative to a predefined optimizing criterion. Additionally, the proposed method includes the step of deriving a set of optimal parameter values being associated with the calculated solution.

The advantages of this method, as well as the preferred embodiments thereof, are apparent from the discussion hereinabove with reference to the proposed system.

According to a further aspect of the invention the object is achieved by a computer program product, which is directly loadable into the internal memory of a computer, and includes software for controlling the above proposed method when said program is run on a computer.

According to another aspect of the invention the object is achieved by a computer readable medium, having a program recorded thereon, where the program is to control a computer to perform the above-proposed method.

The invention provides an interactive solution capable of providing aid when configuring relatively complex products and systems, such as vehicles and personal computers. By means of the invention, a user is provided with a solution to the configuration problem, which is optimal with respect to a predefined optimizing criterion. More importantly, however, the model defining the configuration problem itself may also be interchanged or modified. Thus, the user is offered a very flexible, efficient and intuitive tool to modify the configuration problem and its solution within parameter ranges being compatible with a set of relevant constraints.

Further advantages, advantageous features and applications of the present invention will be apparent from the following description and the dependent claims.

BRIEF DESCRIPTION OF THE SEVERAL VIEWS OF THE DRAWING(S)

The present invention is now to be explained more closely by means of preferred embodiments, which are disclosed as examples, and with reference to the attached drawings.

Figure 3:
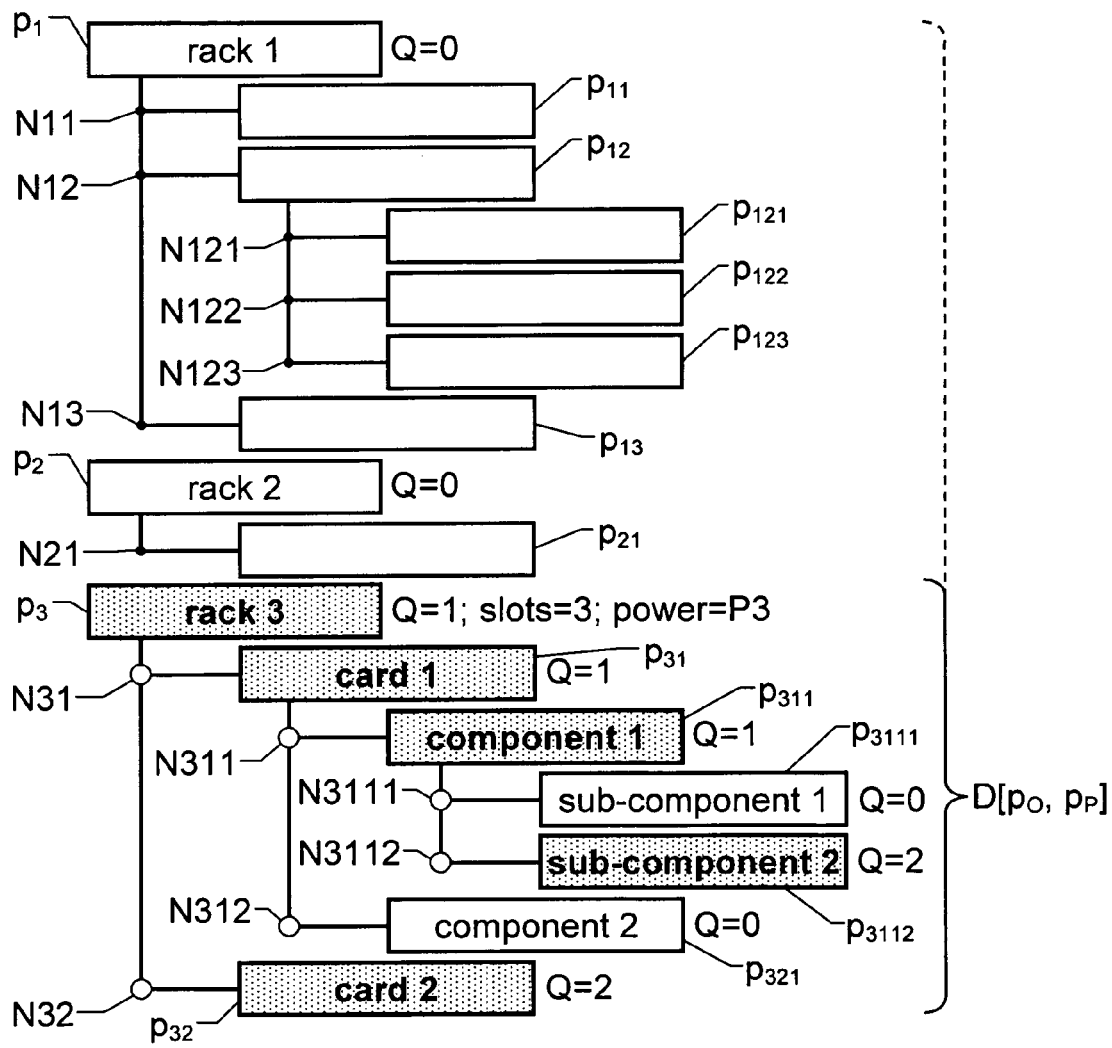
Figure 2:
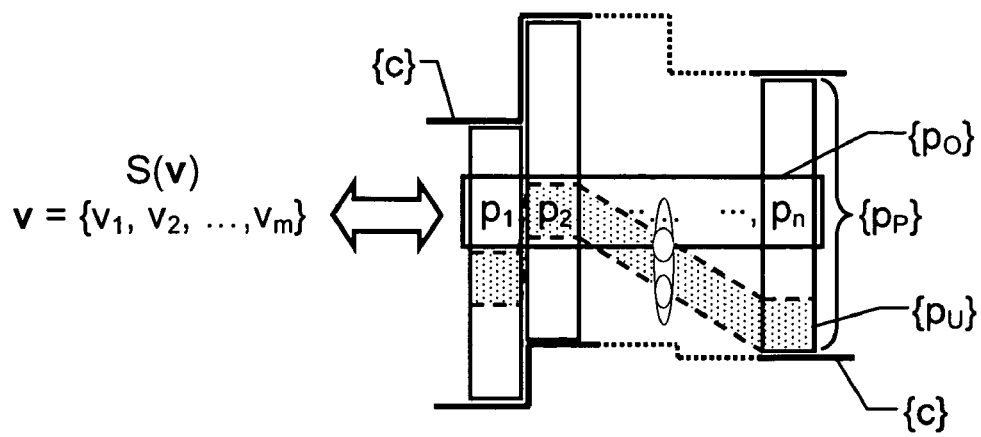
Figure 4:
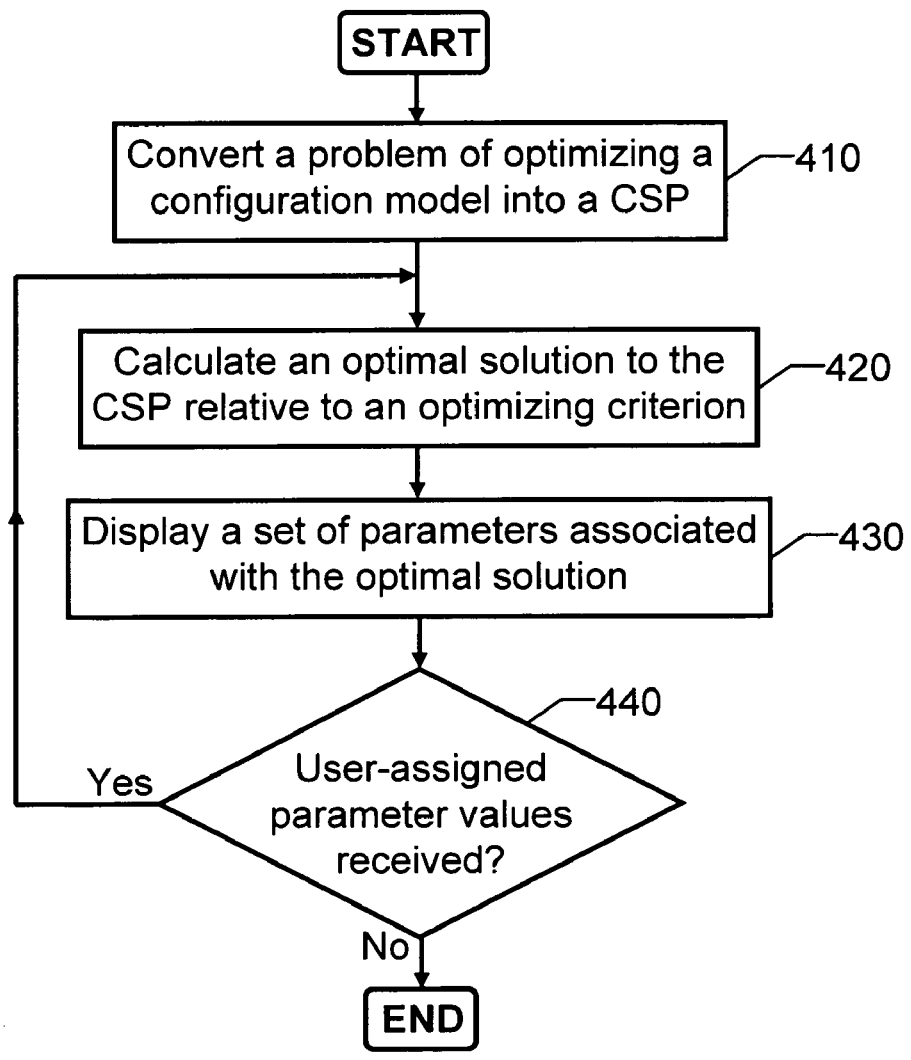

FIG. 1 shows a block diagram over a system according to one embodiment of the invention;

FIG. 2 schematically illustrates how the optimal solution of the CSP and a set of variables associated therewith are related to a set of constraints and a set of optimal parameter values according to one embodiment of the invention;

FIG. 3 illustrates a proposed part-of hierarchy produced according to one embodiment of the invention; and FIG. 4 illustrates, by means of a flow diagram, a general method of controlling a computer apparatus according to the invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

We refer initially to FIG. 1, which shows a block diagram over a system 100 for configuring an artifact having variable features according to one embodiment of the invention. The artifact's features are defined by a set of interrelated parameters $\{p\}$. It is further presumed that a configuration model M, which describes the interrelationships between the parameters $\{p\}$, defines a range of consistent configurations for the artifact.

The system 100 includes a model translation module 120 and a configuration engine 130. Preferably, the system 100 also includes a model interface module 110, a presentation interface module 140 and an input interface module 150. Additionally, the system 100 may include a computer readable storage medium 160 and a processing unit 170. The storage medium 160 has a program recorded thereon, which is adapted to enable the processing unit 170 to control the system 100 according to the proposed procedure.

Either the configuration model M is predefined (however modifiable) by the designer of the system 100, or the model interface module 110 may receive an external arbitrary model description M, and forward this information to the model translation module 120.

In any case, the model translation module 120 is adapted to convert the configuration model M into a constraint satisfaction problem CSP. The CSP, in turn, is defined by a set of variables $\{v\}$ and a set of constraints $\{c\}$. Each variable in the set of variables $\{v\}$ may attain a finite number of different values, and the set of constraints $\{c\}$ restricts which variable values that are simultaneously possible for the variables in the set of variables $\{v\}$.

The configuration engine 130 is adapted to calculate a solution S(v) to the CSP which is optimal with respect to the values assigned to each variable in the CSP relative to a predefined optimizing criterion. The configuration engine 130 is also adapted to derive a set of optimal parameter values $\{p_O\}$, which are associated with the calculated solution S(v) (i.e. the parameter values $\{p_O\}$ being equivalent to variables v in the optimal solution S(v)).

When calculating the optimal solution S(v), the configuration engine 130 may apply a strategy reflected by the below pseudo code.

```
1) OptCrit = variable to be minimized
2) CurMin = max(OptCrit)+1
3) Add the constraint OptCrit < CurMin to the CSP
4) If a solution S to the CSP can be found then
5)    CurMin = to the value of OptCrit in S
6) Else
7)    Return CurMin
8) EndIf
```

This algorithm assumes there are known techniques for finding solutions to the CSP and that there exists at least one solution to the particular CSP. Moreover, the algorithm assumes that the optimization criterion defines that a variable should take a lowest possible value to be optimal. Naturally, according to the invention, other and more complex optimization criteria are equally well conceivable.

It is further preferable if the configuration engine 130 is adapted to derive a set of possible parameter values $\{p_P\}$ that, in addition to the set of optimal parameter values $\{p_O\}$, represents solutions compatible with the set of constraints $\{c\}$. Thus, the set of optimal parameter values $\{p_O\}$ is a sub-set of the set of possible parameter values $\{p_P\}$.

FIG. 2 illustrates graphically how the set of optimal parameter values $\{p_O\}$, the set of possible parameter values $\{p_P\}$ and the set of constraints $\{c\}$ may be interrelated. The FIG. 2 also includes a schematic representation of the optimal solution S(v) to the CSP and the set of variables $v=\{v_1, v_2, \ldots, v_m\}$ associated there with, which is equivalent to the set of optimal parameter values $\{p_O\}$.

Returning now to the FIG. 1, the presentation interface module 140 is adapted to receive at least one set of parameter values, i.e. the set of optimal parameter values $\{p_O\}$ and any set of possible parameter values $\{p_P\}$, from the configuration engine 130. In response to these parameters, the presentation interface module 140 generates at least one display set of parameter values D[Po] (and possibly D[Pp]), which is adapted to be presented on a graphical display for review by a user of the system 100.

Even though the set of optimal parameter values $\{p_O\}$ represents an optimal solution to the CSP with respect to a predefined optimizing criterion, e.g. a minimal cost or a minimal weight, the user may want to adjust these parameters somewhat. Namely, in practice, the "actual" optimizing criterion to be satisfied when configuring the artifact can seldom be expressed in such simple terms as cost, weight, performance, power consumption etc. Instead, more complex (generally tacit) criteria exist.

In order to enable such a user modification, according to one embodiment of the invention, the input interface module 150 is adapted to receive at least one user-generated input defining a set of updated parameter values $\{p_U\}$. Here, we assume that the set of updated parameter values $\{p_U\}$ is included in the set of possible parameter values $\{p_P\}$, i.e. that the user has selected parameter values being consistent with the set of constraints $\{c\}$. In the FIG. 2, the set of updated parameter values $\{p_U\}$ is visualized as a dotted-area sub-set of the set of possible parameter values $\{p_P\}$.

The input interface module 150 forwards the set of updated parameter values $\{p_U\}$ to the configuration engine 130, which calculates an updated solution S(v) to the CSP based on the set of updated parameter values $\{p_U\}$. The configuration engine 130 also derives a set of optimal parameter values $\{p_O\}$ being associated with the updated solution S(v).

In order to elucidate some additional aspects of the invention, we now refer to FIG. 3 showing a proposed part-of hierarchy, which is produced by the system 100 according to one embodiment of the invention. The part-of hierarchy represents the configuration model M in the form of a structure wherein the hierarchy includes a number of nodes, here N11, N12, N121, N122, N123, N21, N31, N311, N3111, N3112, N312 and N32, which each represents a respective variable in the set of variables $\{v\}$. The part-of hierarchy implies that elements associated with an underlying node form parts of the nodes above. Thus, in the example shown in the FIG. 3, a product, say a PC, may have three different racks, namely rack 1, rack 2 or rack 3 being represented by the parameters $p_1$, $p_2$ and $p_3$ respectively. Depending on which rack that is selected, different cards, components and sub-components may be used. For instance, rack 1 may hold cards represented by the parameters $p_{11}$, $p_{12}$ and $p_{13}$ (equivalent to nodes N11, N12 and N13), and the card represented by the parameter $p_{12}$ may in turn be equipped with components represented by the parameters $p_{121}$, $p_{122}$ and $p_{123}$ (equivalent to nodes N121, N122 and N123), and so on.

Moreover, each node which is associated with a variable included in the optimal solution S(v) is defined as an active node. In the illustrated example, the nodes N31, N311, N3111, N3112, N312 and N32 are active. In the FIG. 3, this is symbolized by means of white circles. Thus, a configuration wherein rack 3 contains one card 1 and two cards 2 has been calculated to be optimal. The card 1, in turn, is equipped with component 1, which contains two copies of the sub-component 2.

As mentioned above, according to one preferred embodiment of the invention, the presentation interface module 140 is adapted to generate at least one display set of parameter values D[$p_O$, $p_P$] to be presented on a graphical display observable by a user. Preferably, the at least one display set of parameter values D[$p_O$, $p_P$] exclusively includes parameter values $\{p_P\}$ and/or $\{p_O\}$ that are derivable from the variables in the set of variables $\{v\}$, which are associated with the active nodes N31, N311, N3111, N3112, N312 and N32.

Consequently, the user will only see those parameter values $p_3$, $p_{31}$, $p_{311}$, $p_{3111}$, $p_{3112}$, $p_{321}$ and $p_{32}$ that are closest connected to the optimal solution S(v) of the CSP, i.e. equivalent to the active nodes N31, N311, N3111, N3112, N312 and N32 within the unbroken bracket. However, the topmost nodes N11, N12, N121, N122, N123, N13 and N21 within the dashed bracket are preferably hidden to the user.

According to one preferred embodiment of the invention, the set of variables $\{v\}$ represents a finite set of possible values where each variable is characterized by at least a type ("rack 1", "rack 2", "rack 3", "card 1", "card 2", "card 3", "component 1", "component 2", "sub-component 1" and "sub-component 2"), and a quantity ("Q"). Furthermore, auxiliary parameters, such as "a number of slots" "power provided", "power consumed" and "power required" may be specified for each variable.

To sum up, the general method of controlling a computer apparatus according to the invention will now be described with reference to the flow diagram in FIG. 4.

An initial step 410 converts a configuration model into a CSP. We here presume that the configuration model describes an artifact having variable features defined by a set of interrelated parameters. The CSP, on the other hand, is defined by a set of variables and a set of constraints. Each variable in the set of variables may attain a finite number of different values, and the set of constraints restricts which variable values that are simultaneously possible for the variables in the set of variables.

A step 420 then calculates a solution to the CSP, which is optimal with respect to a value assigned to each variable in the CSP relative to a predefined optimizing criterion. The step 420 also derives a set of optimal parameter values associated with the optimal solution.

Thereafter, a step 430 preferably displays the set of optimal parameter values on a graphical display. Subsequently, a step 440 preferably checks whether a user-generated input has been received, which defines a set of updated parameter values. If so, the procedure loops back to the step 420 for calculation of a new optimal solution to the CSP, i.e. on the basis of the user-assigned parameter values. Otherwise, the procedure ends. Either a pre-determined interval is defined within which the user-generated input must be received, or the procedure loops back to the step 420 whenever any user-generated input is received.

All of the process steps, as well as any sub-sequence of steps, described with reference to the FIG. 4 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

That which is claimed:

1. A system for configuring an artifact having variable features defined by a set of interrelated parameters, a predefined set of components constituting a basis for assembling the artifact, and the components exclusively being interconnectable in a predefined way defined by a configuration model describing the interrelationships between the parameters and a range of consistent configurations for the artifact, the system comprising:
   a model translation module arranged to convert the configuration model into a constraint satisfaction problem, the constraint satisfaction problem being defined by a set of variables, wherein each variable may attain a finite number of different values, the variables representing at least one component selection, and for each selected component the variables further representing a respective quality and at least one value of a product feature associated with the component, and a set of constraints restricting which variable values that are simultaneously possible for the variables in the set of variables; and
   a configuration engine arranged to:
      calculate a solution to the constraint satisfaction problem, the calculated solution being optimal with respect to a value assigned to each variable in the constraint satisfaction problem relative to a predefined optimizing criterion; and
      derive a set of optimal parameter values associated with the calculated solution,
      wherein the set of optimal parameter values are arranged to be used to configure the artifact.

2. The system according to claim 1, wherein the configuration engine is further arranged to derive a set of possible parameter values compatible with the set of constraints, the set of possible parameter values including the set of optimal parameter values.

3. The system according to claim 1, wherein the system comprises a presentation interface module arranged receive at least one set of parameter values from the configuration engine, and in response thereto generate at least one display set of parameter values arranged to be presented on a graphical display.

4. The system according to claim 1, comprising an input interface module arranged to:
   receive at least one user-generated input defining a set of updated parameter values, the set of updated parameter values being included in the set of possible parameter values; and
   forward the set of updated parameter values to the configuration engine.

5. The system according to claim 4, the configuration engine is arranged to:
   calculate an updated solution to the constraint satisfaction problem based on the set of updated parameter values; and
   derive a set of optimal parameter values associated with the updated solution.

6. system according to claim 1, wherein the configuration model is structured as a part-of hierarchy comprising a number of nodes, a respective variable in the set of variables being associated with each bf said nodes, and each node of said nodes which is associated with a variable included in the calculated solution is defined as an active node.

7. The system according to claim 6, wherein the system comprises a presentation interface module arranged to generate at least one display set of parameter values arranged to be presented on a graphical display, the at least one display set of parameter values including parameter values derivable from variables in the set of variables associated with the active nodes.

8. The system according to claim 7, wherein the at least one display set of parameter values exclusively includes parameter values derivable from variables in the set of variables associated with the active nodes.

9. The system according to claim 1, wherein the optimizing criterion reflects a minimum total cost for the artifact.

10. A method of configuring an artifact having variable features defined by a set of interrelated parameters, a predefined set of components constituting a basis for assembling the artifact, and the components exclusively being interconnectable in a predefined way defined by a configuration model describing the interrelationships between the parameters and a range of consistent configurations for the artifact, the method comprising:
  converting the configuration model into a constraint satisfaction problem, the constraint satisfaction problem being defined by:
    a set of variables, wherein each variable may attain a finite number of different values, the variables representing at least one component selection, and for each selected component the variables further representing a respective quality and at least one value of a product feature associated with the component, and
    a set of constraints restricting which variable values being simultaneously possible for the variables in the set of variables;
  calculating a solution to the constraint satisfaction problem, the calculated solution being optimal with respect to a value assigned to each variable in the constraint satisfaction problem relative to a predefined optimizing criterion; and
  deriving a set of optimal parameter values associated with the calculated solution,
  wherein the set of optimal parameter values are arranged to be used to configured the artifact.

11. The method according to claim 10, further comprising deriving a set of possible parameter values compatible with the set of constraints, the set of possible parameter values including the set of optimal parameter values.

12. The method according to claim 10, further comprising generating at least one display set of parameter values in response to at least one derived set of parameter values, the at least one display set of parameter values being arranged to be presented on a graphical display.

13. The method according to claim 10, further comprising receiving at least one user-generated input defining a set of updated parameter values, the set of updated parameter values being included in the set of possible parameter values.

14. The method according to claim 13, further comprising:
  calculating an updated solution to the constraint satisfaction problem based on the set of updated parameter values; and
  deriving a set of optimal parameter values associated with the updated solution.

15. The method according to claim 10, wherein the configuration model is structured as a part-of hierarchy comprising a number of nodes, a respective variable in the set of variables is associated with each of said nodes, and each node of said nodes which is associated with a variable included in the calculated solution is defined as an active node.

16. The method according to claim 15, further comprising generating at least one display set of parameter values arranged to be presented on a graphical display, the at least one display set of parameter values including parameter values derivable from variables in the set of variables associated with the active nodes.

17. The method according to claim 16, wherein the at least one display set of parameter values exclusively includes parameter values derivable from variables in the set of variables associated with the active nodes.

18. The method according to claim 10, wherein optimizing criterion reflects a minimum total cost for the artifact.

19. A computer program product for configuring an artifact having variable features defined by a set of interrelated parameters, a predefined set of components constituting a basis for assembling the artifact, and the components exclusively being interconnectable in a predefined way defined by a configuration model describing the interrelationships between the parameter and a range of consistent configurations for the artifact, said computer program product comprising a computer-readable storage medium having computer-readable program code portions stored therein, said computer-readable program code portions comprising:
  first computer instruction means for converting the configuration model into a constraint satisfaction problem, the constraint satisfaction problem being defined by:
    a set of variables, wherein each variable may attain a finite number of different values, the variables representing at least one component selection, and for each selected component the variables further representing a respective quality end at least one value of a product feature associated with the component, and
    a set of constraints restricting which variable values being simultaneously possible for the variables in the set of variables;
  second computer instruction means for calculating a solution to the constraint satisfaction problem, the calculated solution being optimal with respect to a value assigned to each variable in the constraint satisfaction problem relative to a predefined optimizing criterion; and
  third computer instruction means for deriving a set of optimal parameter values associated with the calculated solution,
  wherein the set of optimal parameter values are arranged to be used to configure the artifact.

20. The method according to claim 19, further comprising fourth computer instruction means for deriving a set of possible parameter values compatible with the set of constraints, the set of possible parameter values including the set of optimal parameter values.

21. The method according to claim 19, further comprising fourth computer instruction means for generating at least one display set of parameter values in response to at least one derived set of parameter values, the at least one display set of parameter values being arranged to be presented on a graphical display.

22. The method according to claim 19, further comprising fourth computer instruction means for receiving at least one user-generated input defining a set of updated parameter values, the set of updated parameter values being included in the set of possible parameter values.

23. The method according to claim 22, further comprising:
  fifth computer instruction means for calculating an updated solution to the constraint satisfaction problem based on the set of updated parameter values; and
  sixth computer instruction means for deriving a set of optimal parameter values associated with the updated solution.

24. The method according to claim 19, wherein the configuration model is structured as a part-of hierarchy comprising a number of nodes, a respective variable in the set of variables is associated with each of said nodes, and each node of said nodes which is associated with a variable included in the calculated solution is defined as an active node.

25. The method according to claim 24, further comprising fourth computer instruction means for generating at least one display set of parameter values arranged to be presented on a graphical display, the at least one display set of parameter values including parameter values derivable from variables in the set of variables associated with the active nodes.

26. The method according to claim 25, wherein the at least one display set of parameter values exclusively includes parameter values derivable from variables in the set of variables associated with the active nodes.

27. The method according to claim 19, wherein the optimizing criterion reflects a minimum total cost for the artifact.

28. A computer-readable storage medium having computer-readable program code portions stored therein, said computer-readable program code portions comprising:
    first computer instruction means for convening a configuration model describing the interrelationships between a set of interrelated parameters defining variable features of an artifact into a constraint satisfaction problem, the constraint satisfaction problem being defined by:
        a set of variables, wherein each variable may attain a finite number of different values, the variables representing at least one component selection, and for each selected component the variables further representing a respective quality and at least one value of a product feature associated with the component, and
        a set of constraints restricting which variable values being simultaneously possible for the variables in the set of variables;
    second computer instruction means for calculating a solution to the constraint satisfaction problem, the calculated solution being optimal with respect to a value assigned to each variable in the constraint satisfaction problem relative to a predefined optimizing criterion; and
    third computer instruction means for deriving a set of optimal parameter values associated with the calculated solution,
    wherein the set of optimal parameter values are arranged to be used to configure the artifact, the artifact having variable features defined by the set of interrelated parameters, a predefined set of components constituting a basis for assembling the artifact, and the components exclusively being interconnectable in a predefined way defined by the configuration model describing the interrelationships between the parameters and a range of consistent configurations for the artifact.

29. The storage medium according to claim 28, further comprising fourth computer instruction means for deriving a set of possible parameter values compatible with the set of constraints, the set of possible parameter values including the set of optimal parameter values.

30. The storage medium according to claim 28, further comprising fourth computer instruction means for generating at least one display set of parameter values in response to at least one derived set of parameter values, the at least one display set of parameter values being arranged to be presented on a graphical display.

31. The storage medium according to claim 28, further comprising fourth computer instruction means for receiving at least one user-generated input defining a set of updated parameter values, the set of updated parameter values being included in the set of possible parameter values.

32. The storage medium according to claim 31, further comprising:
    fifth computer instruction means for calculating an updated solution to the constraint satisfaction problem based on the set of updated parameter values; and
    sixth computer instruction means for deriving a set of optimal parameter values associated with the updated solution.

33. The storage medium according to claim 28, wherein the configuration model is structured as a part-of hierarchy comprising a number of nodes, a respective variable in the set of variables is associated with each of said nodes, and each node of said nodes which is associated with a variable included in the calculated solution is defined as an active node.

34. The storage medium according to claim 33, further comprising fourth computer instruction means for generating at least one display set of parameter values arranged to be presented on a graphical display, the at least one display set of parameter values including parameter values derivable from variables in the set of variables associated with the active nodes.

35. The storage medium according to claim 34, wherein the at least one display set of parameter values exclusively includes parameter values derivable from variables in the set of variables associated with the active nodes.

36. The storage medium according to claim 28, wherein the optimizing criterion reflects a minimum total cost for the artifact.

* * * * *

UNITED STATES PATENT AND TRADEMARK OFFICE
CERTIFICATE OF CORRECTION

PATENT NO. : 7,457,789 B2
APPLICATION NO. : 11/205941
DATED : November 25, 2008
INVENTOR(S) : Axling It is certified that error appears in the above-identified patent and that said Letters Patent is hereby corrected as shown below:

Column 8,
Line 41, after "arranged" insert --to--;
Line 63, delete "bf" and insert --of--.

Column 9,
Line 40, "configured" should read --configure--.

Column 10,
Line 17, "parameter" should read --parameters--;
Line 29, "end" should read --and--.

Column 11,
Line 22, "convening" should read --converting--.

Signed and Sealed this

Seventeenth Day of March, 2009

JOHN DOLL
*Acting Director of the United States Patent and Trademark Office*